US007508176B2

(12) United States Patent
Hartular et al.

(10) Patent No.: US 7,508,176 B2
(45) Date of Patent: Mar. 24, 2009

(54) CONTROLLER FOR A DC TO DC CONVERTER HAVING LINEAR MODE AND SWITCH MODE CAPABILITIES

(75) Inventors: Alexandru Hartular, San Jose, CA (US); Chun Lu, San Jose, CA (US); You-Yuh Shyr, San Jose, CA (US); Constantin Bucur, Santa Clara, CA (US); Vlad Mihail Popescu-Stanesti, San Jose, CA (US); Jiwei Chen, Santa Clara, CA (US); Oleg Kobildjanov, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/250,048

(22) Filed: Oct. 13, 2005

(65) Prior Publication Data

US 2006/0028188 A1    Feb. 9, 2006

Related U.S. Application Data

(63) Continuation-in-part of application No. 11/057,913, filed on Feb. 15, 2005, which is a continuation-in-part of application No. 10/928,285, filed on Aug. 27, 2004.

(60) Provisional application No. 60/622,150, filed on Oct. 26, 2004, provisional application No. 60/571,176, filed on May 14, 2004.

(51) Int. Cl.
    *G05F 1/59* (2006.01)
(52) U.S. Cl. ....................... 323/268; 323/273
(58) Field of Classification Search .......... 323/273, 323/282, 274, 276, 277, 284, 268, 350, 224, 323/349, 283, 285
See application file for complete search history.

(56) References Cited

U.S. PATENT DOCUMENTS

| 4,540,904 A | * | 9/1985 | Ennis et al. ............... 326/58 |
| 6,236,194 B1 | * | 5/2001 | Manabe et al. ............ 323/274 |
| 6,356,063 B1 | * | 3/2002 | Brooks ..................... 323/284 |
| 6,452,368 B1 | * | 9/2002 | Basso et al. .............. 323/282 |
| 6,798,178 B1 | * | 9/2004 | Bayadroun ................ 323/274 |

OTHER PUBLICATIONS

English translation of China Office Action, dated Jul. 27, 2007, from related Chinese application 200510116610.9.
Taiwanese Office Action received in related Taiwanese Patent Application No. 095134693 dated Dec. 10, 2008.

* cited by examiner

*Primary Examiner*—Akm E Ullah
*Assistant Examiner*—Harry Behm
(74) *Attorney, Agent, or Firm*—Grossman, Tucker, Perreault & Pfleger, PLLC

(57) ABSTRACT

A controller for a DC to DC converter. The controller may comprise linear mode circuitry and switch mode control circuitry. The linear mode control circuitry may be capable of providing a first control signal to a controlled device of the DC to DC converter. The controlled device may operate as a variable resistor in response to the first control signal to control an output voltage of the DC to DC converter. The switch mode control circuitry may be capable of providing a second control signal to the controlled device of the DC to DC converter. The controlled device may turn ON and OFF in response to the second control signal to control the output voltage of the DC to DC converter. One of the linear mode control circuitry and the switch mode control circuitry may be enabled. The controller may also include protection circuitry.

18 Claims, 14 Drawing Sheets

CONTROLLER FOR A DC TO DC CONVERTER HAVING LINEAR MODE AND SWITCH MODE CAPABILITIES

CROSS REFERENCE TO RELATED APPLICATIONS

This application is a continuation-in-part of U.S. Nonprovisional application Ser. No. 11/057,913, filed Feb. 15, 2005, which also claims the benefit of the filing date of U.S. Provisional Application Ser. No. 60/622,150, filed Oct. 26, 2004, both the teachings of which are incorporated herein by reference. This application is also a continuation-in-part of U.S. Nonprovisional application Ser. No. 10/928,285, filed Aug. 27, 2004, which also claims the benefit of the filing date of U.S. Provisional Application Ser. No. 60/571,176, filed May 14, 2004, both the teachings of which are also incorporated herein by reference.

FIELD

This disclosure relates to DC to DC converters and in particular to controllers for DC to DC converters.

BACKGROUND

A variety of electronic devices such as portable computers, portable phones, personal digital assistants, and other portable and non-portable electronic devices may utilize one or more DC to DC converters. DC to DC converters generally convert an input DC voltage to a regulated output DC voltage. A DC to DC converter may be utilized to serve a variety of loads within an electronic device. The load served by the DC to DC converter may vary from a relatively light load to a relatively heavy load. The distinction between a light and heavy load may vary based on a particular application, system, and/or user requirement.

Different types of DC to DC converters may be more suitable for serving light or heavy loads. A linear mode voltage regulator may be one type of DC to DC converter that is more suitable to providing power to light loads. The linear mode voltage regulator may monitor changes in output DC voltage and provide a control signal to a transistor to hold the output voltage at the desired value. One type of a linear mode voltage regulator may be a low drop output voltage regulator (LDO) that can provide power to a relatively light load with relatively little voltage drop and with a low noise output. Another type of DC to DC converter may be a switch mode DC to DC converter that holds the output voltage at a desired value by turning at least one transistor of the DC to DC converter ON and OFF. Such a switching type of DC to DC converter may provide a regulated output voltage at a relatively high efficiency when serving a heavy load.

A conventional method of serving one load that may be either a light or heavy load under differing conditions is to provide one DC to DC converter, e.g., an LDO, for serving the light loads, and to provide another separate DC to DC converter, e.g., a switching mode DC to DC converter, for serving the heavy loads and to switch over between each DC to DC converter under certain circumstances. Such a conventional method requires two DC to DC converters and additional components and pins to facilitate switching between each adding cost and complexity.

Accordingly, there is a need for a controller for one DC to DC converter to have both linear mode and switch mode capabilities.

BRIEF SUMMARY OF THE INVENTION

According to one aspect of the invention, there is provided a controller for a DC to DC converter. The controller may comprise linear mode circuitry, switch mode control circuitry, and protection circuitry. The linear mode control circuitry capable of providing a first control signal to a controlled device of the DC to DC converter. The controlled device may operate as a variable resistor in response to the first control signal to control an output voltage of the DC to DC converter. The switch mode control circuitry may be capable of providing a second control signal to the controlled device of the DC to DC converter. The controlled device may operate as a switch to turn ON and OFF in response to the second control signal to control the output voltage of the DC to DC converter. One of the linear mode control circuitry and the switch mode control circuitry may be enabled to control the controlled device in response to a state of an enable signal. The protection circuitry may be configured to accept a signal representative of the output voltage of the DC to DC converter and compare the signal to an under voltage threshold and compensate the first or second control signal provided to the controlled device if the signal representative of the output voltage is less than said under voltage threshold. The protection circuitry may further be configured to compare the signal to an over voltage threshold and to compensate the first or second control signal provided to the controlled device if said signal representative of the output voltage is greater than the over voltage threshold.

According to another aspect of the invention, there is provided a DC to DC converter. The DC to DC converter may comprise a controlled device and a controller to control the controlled device. The controller may comprise linear mode circuitry and switch mode control circuitry. The linear mode control circuitry capable of providing a first control signal to a controlled device of the DC to DC converter. The controlled device may operate as a variable resistor in response to the first control signal to control an output voltage of the DC to DC converter. The switch mode control circuitry may be capable of providing a second control signal to the controlled device of the DC to DC converter. The controlled device may operate as a switch to turn ON and OFF in response to the second control signal to control the output voltage of the DC to DC converter. One of the linear mode control circuitry and the switch mode control circuitry may be enabled to control the controlled device in response to a state of an enable signal. The protection circuitry may be configured to accept a signal representative of the output voltage of the DC to DC converter and compare the signal to an under voltage threshold and compensate the first or second control signal provided to the controlled device if the signal representative of the output voltage is less than said under voltage threshold. The protection circuitry may further be configured to compare the signal to an over voltage threshold and to compensate the first or second control signal provided to the controlled device if said signal representative of the output voltage is greater than the over voltage threshold.

According to another aspect of the invention, there is provided a method. The method may include providing a first control signal to a controlled device of a DC to DC converter during a first time period, the first control signal provided by linear mode control circuitry of a controller, the controlled device operating as a variable resistor in response to the first control signal to control an output voltage of the DC to DC converter. The method may further include providing a second control signal to the controlled device of the DC to DC converter during a second time period, the second time period not overlapping the first time period, the second control signal provided by switch mode control circuitry of the controller, the controlled device turning ON and OFF in response to the second control signal to control the output voltage of the DC to DC converter. The method may further include comparing a signal representative of the output voltage of the DC to DC converter to an over voltage threshold level and an under voltage threshold, and compensating the first or second control signal if the signal representative of the output voltage is greater than the over voltage threshold level or less than the under voltage threshold level.

According to yet a further aspect of the invention there is provided an apparatus. The apparatus may include an integrated circuit capable of selecting among a plurality of charging modes to charge a rechargeable battery. The plurality of charging modes may include a switch mode and a linear mode.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
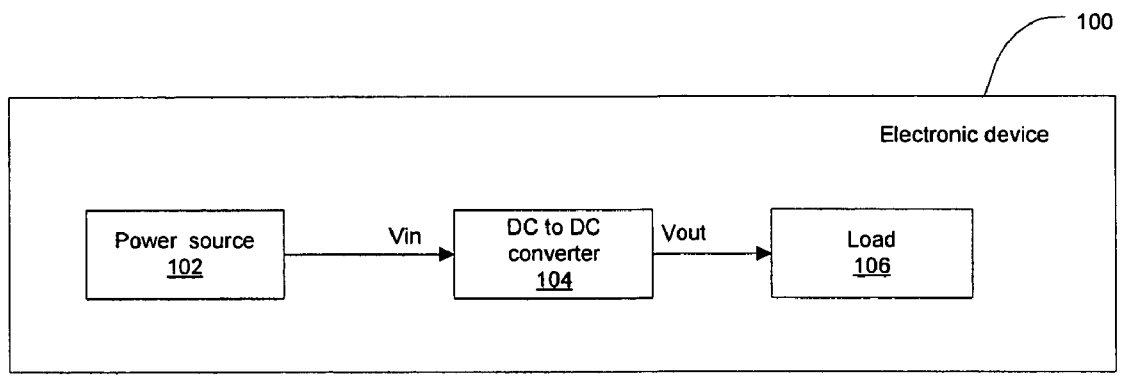
FIG. 1 is a diagram of a system embodiment.

FIG. 1 illustrates a block diagram of an electronic device 100 having a power source 102, a DC to DC converter 104, and a load 106. The electronic device 100 may be a variety of devices such as a laptop computer, portable phone, personal digital assistant, and the like. The power source 102 may be any variety of power sources such as a battery, e.g., a lithium battery, for providing unregulated DC voltage (Vin) to the DC to DC controller 104. The DC to DC converter 104 may provide a regulated output DC voltage (Vout) to the load 106. Although only one DC to DC converter 104 and one associated load 106 is illustrated for clarity, the electronic device 100 may have a plurality of DC to DC converters serving any plurality of loads.

Figure 2:
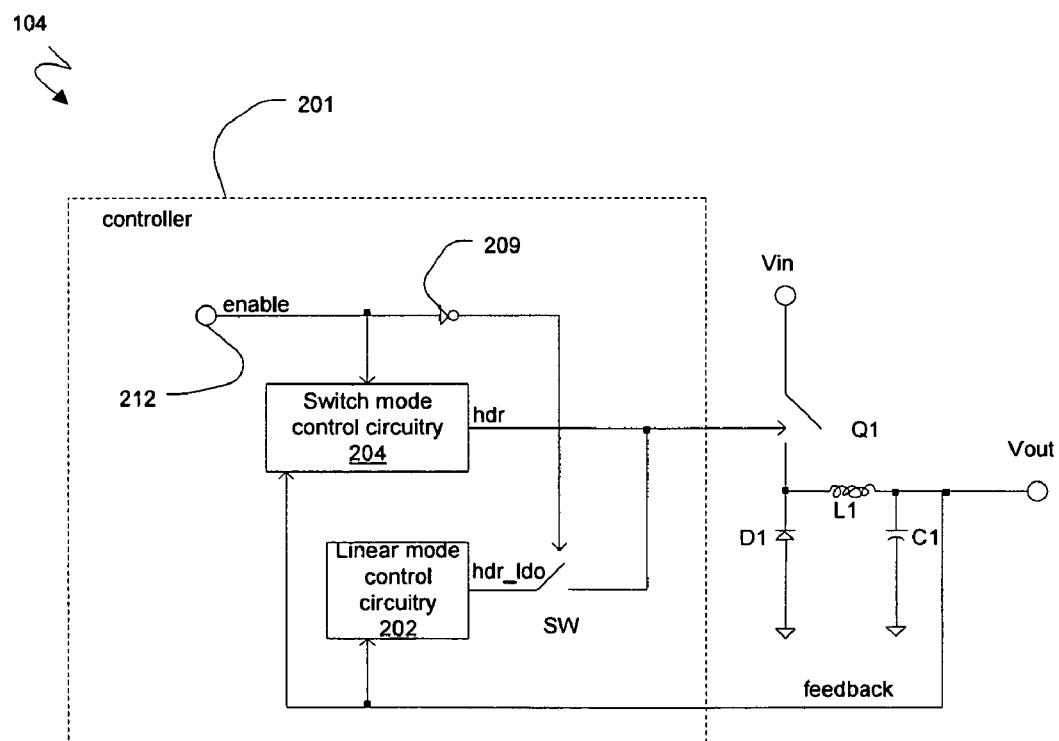
FIG. 2 is a diagram of the DC to DC converter of FIG. 1.

FIG. 2 is a block diagram of the DC to DC converter 104 of FIG. 1 in more detail. The DC to DC converter 104 may generally include a controller 201 for controlling the state of at least one transistor Q1 to control the output DC voltage Vout of the DC to DC converter. The transistor Q1 may be any variety of transistor types. The controller 201 may include linear mode control circuitry 202 and switch mode control circuitry 204. As used herein, "circuitry" may comprise, for example, singly or in any combination, hardwired circuitry, programmable circuitry, state machine circuitry, and/or firmware that stores instructions executed by programmable circuitry. Either the linear mode control circuitry 202 or the switch mode control circuitry 204 may control the state of the transistor Q1 of the DC to DC controller at different, non-overlapping, time intervals in response to a state of the enable signal at terminal 212.

If the enable signal is a digital zero, the switch mode control circuitry 204 may be disabled and not provide any control signal to the transistor Q1. In contrast, the linear mode control circuitry 202 may be enabled to control the state of the transistor Q1 by the closing of the switch SW in response to the digital zero enable signal. When the switch SW is closed, the linear mode control circuitry 202 may provide a first control signal, e.g., hdr_ldo, to the transistor Q1. In response to the first control signal from the linear mode control circuitry 202, the transistor Q1 may operate in a linear region and control the output voltage of the DC to DC converter. The first control signal may be an analog voltage signal.

If the enable signal is a digital one, the switch mode control circuitry 204 may be enabled to provide a second control signal to the transistor Q1. The output of the inverter 209 may now by a digital zero and the switch SW may open in response thereto. Hence, the linear mode control circuitry 202 may not be able to control the transistor Q1 in this instance. In response to the second control signal from the switch mode control circuitry 204, the transistor Q1 may turn ON and OFF to control the output voltage of the DC to DC converter. A feedback signal representative of the output voltage Vout may be provided to both the linear mode circuitry 202 and the switch mode circuitry 204 and the first and second control signals from each circuitry 202, 204 may be based at least in part on a comparison of the feedback signal with a reference voltage level.

Figure 3:
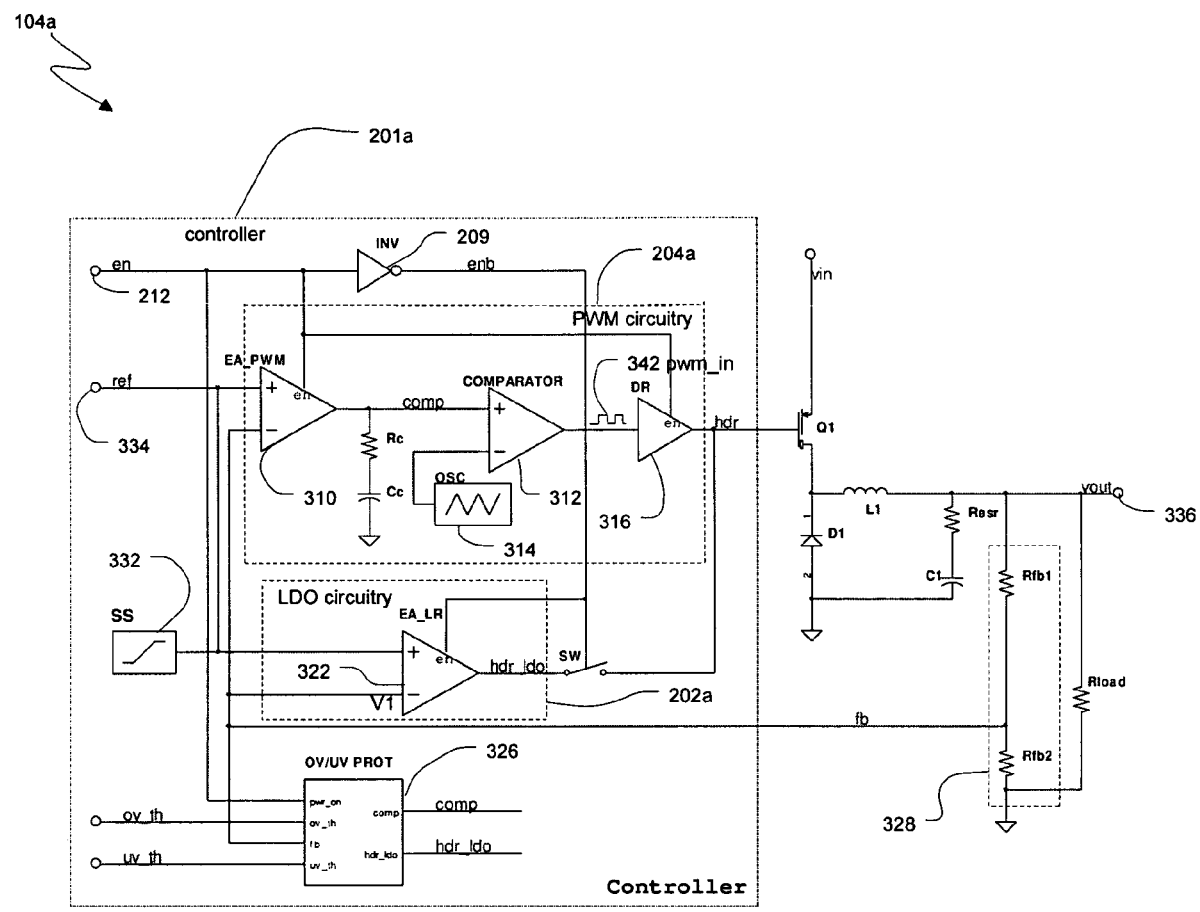
FIG. 3 is a circuit diagram of one embodiment of the DC to DC converter of FIG. 2 including a controller of the DC to DC converter.

FIG. 3 illustrates an embodiment of a DC to DC converter 104a consistent with the DC to DC converter 104 of FIG. 2. The controller 201a may include low dropout voltage regulator (LDO) circuitry 202a functioning as the linear mode circuitry 202. The controller 201a may also include pulse width modulation (PWM) circuitry 204a functioning as the switch mode control circuitry 204. The PWM circuitry 204a may function as a voltage control mode asynchronous PWM controller in one embodiment as detailed in FIG. 3. In other embodiments, the switch mode control circuitry 204 may include other types of controllers including, but not limited to, a current control mode controller, synchronous controller, or pulse frequency modulation (PFM) controller. The transistor Q1 may be a p-type metal oxide semiconductor field effect transistor (MOSFET) or PMOS having its gate electrode adapted to receive the first control signal from the LDO circuitry 202a or the second control signal from the PWM circuitry 204a depending on the state of the enable signal (en).

If the enable signal is a digital zero, the PWM circuitry 204a may be disabled by placing the driver 316 in a high impedance state. The LDO circuitry 202a may also be enabled to provide its control signal (hdr_ldo) to the control terminal of PMOS transistor Q1 by the closing of the switch SW. The control signal (hdr_ldo) provided by the LDO circuitry 202a may be an analog voltage signal and the transistor Q1 may be responsive to this control signal to operate in its linear region and to conduct more or less current to adjust the output voltage level Vout. When the transistor Q1 is operating in its linear region under control of the LDO circuitry 202a, the output voltage of the DC to DC converter advantageously has an extremely low ripple voltage and the controller 201a consumes a low quiescent current.

The LDO circuitry 202a may include amplifier 322 functioning as an error amplifier. The amplifier 322 may receive a feedback signal representative of the output voltage Vout at its inverting input terminal. The feedback signal may have a voltage level V1 that may be a scaled down version of Vout as scaled down by the feedback resistive network 328 including resistors Rfb1 and Rfb2 forming a voltage divider. The amplifier 322 may also receive a reference voltage signal at its noninverting input terminal via reference terminal 334. This reference voltage signal may be provided by any variety of sources including, in one instance, a bandgap circuit.

In DC operation, the amplifier 322 of the LDO circuitry 202a may function as an error amplifier by comparing the reference voltage signal with the voltage level V1 and providing an appropriate output control signal (hdr_ldo) to the transistor Q1 via closed switch SW based on the difference between such voltage signals or a voltage error signal. The transistor Q1 may be responsive to this control signal to operated in a linear region and make any necessary adjustments to drive the voltage error signal as close to zero as possible by modifying the output voltage level Vout.

For instance, if the output voltage Vout at terminal 336 increases above a desired regulated voltage level, the feedback voltage level V1 also increases. Thus the error voltage between the inputs of the amplifier 322 would result in a control signal (hdr_ldo) that causes the transistor Q1 to conduct less current to reduce the output voltage Vout. In contrast, if the output voltage Vout at terminal 336 decreases below a desired regulated voltage level, the voltage level V1 also decreases. Thus the error voltage between the inputs of the amplifier 322 would result in a control signal (hdr_ldo) that causes the transistor Q1 to conduct more current to increase the output voltage Vout.

If the enable signal is a digital one, the driver 316 of the PWM circuitry 204a may be enabled to provide a PWM control signal (hdr) to the PMOS transistor Q1. In addition, the output of the inverter 209 may be a digital zero and the switch SW may open in response thereto to effectively prevent the control signal (hdr_ldo) from the LDO circuitry 202a from controlling the PMOS transistor. The PMOS transistor Q1 may turn ON and OFF in response to a duty cycle of the PWM control signal (hdr) to regulate the output voltage Vout. Thus the controller 201a operates as a PWM controller when the enable signal is a digital one, and the PMOS transistor Q1 operates as a switch with an ON-OFF frequency determined by the ramp signal from the oscillator 314 which can result in a high efficiency of over 90%.

The PWM circuitry 204a may include an error amplifier 310, an oscillator 314 to generate a ramp signal, a comparator 312, a compensating capacitor Cc and resistor Rc, and a driver 316. The error amplifier 310 may receive the feedback signal (fb) at its invertering input. The feedback signal may be representative of the output voltage Vout at terminal 336. The error amplifier 310 may also receive a reference voltage signal from terminal 334 at its noninverting input terminal and provide an output signal dependent on the difference. The comparator 312 may receive the comp signal at its noninverting input terminal and a ramp signal from the oscillator 314 at its inverting input terminal and provide an output PWM signal 342 (pwm_in) having a duty cycle based on the intersection of the comp signal with the ramp signal.

The controller 201a may also include over voltage/under voltage protection circuitry 326 to protect the DC to DC converter against over voltage and under voltage conditions. The controller 201a may also include soft-start circuitry 332.

Figure 4:
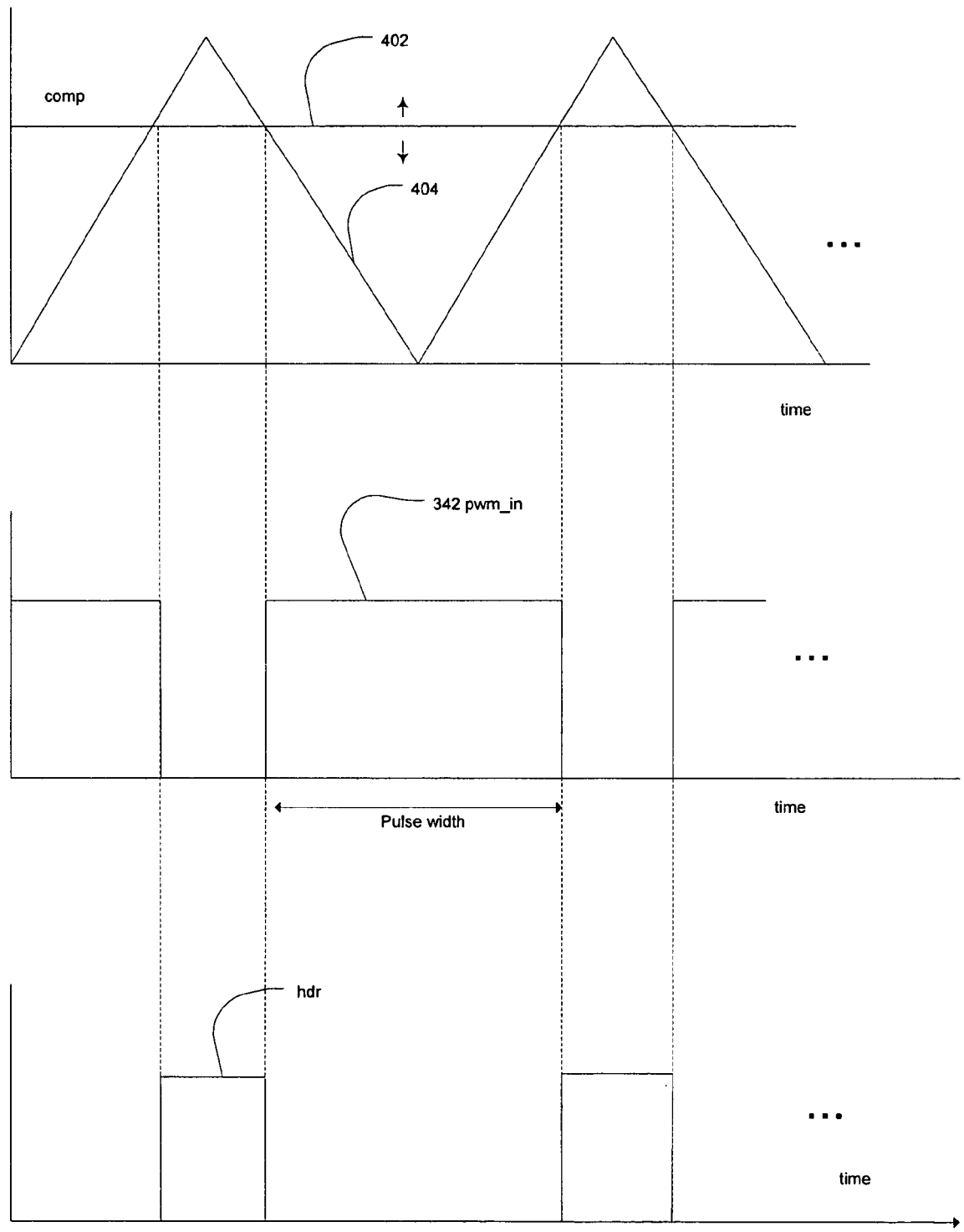
FIG. 4 illustrates plots of various signals of the pulse width modulation circuitry of the controller of FIG. 3.

FIG. 4 illustrates the comp signal 402 input to the noninverting input terminal of comparator 312 and the ramp signal 404 (from oscillator 314 of FIG. 3) provided to the comparator 312 of FIG. 3. As the value of the comp signal 402 rises and falls, the intersection of the comp signal 402 with the ramp signal 404 changes. The resulting pwm_in signal 342 output from the comparator 312 may therefore have a pulse width and hence duty cycle dependent on the value of this intersection. As the comp signal falls, the duty cycle of the pwm_in 342 signal falls and as the comp signal rises the duty cycle of the PWM signal also rises. The driver 316 may accept this pwm_in signal 342 and provide an output PWM signal (hdr) to PMOS transistor Q1 that is the inverse of the pwm_in signal 342 as illustrated in FIG. 4.

Figure 5:
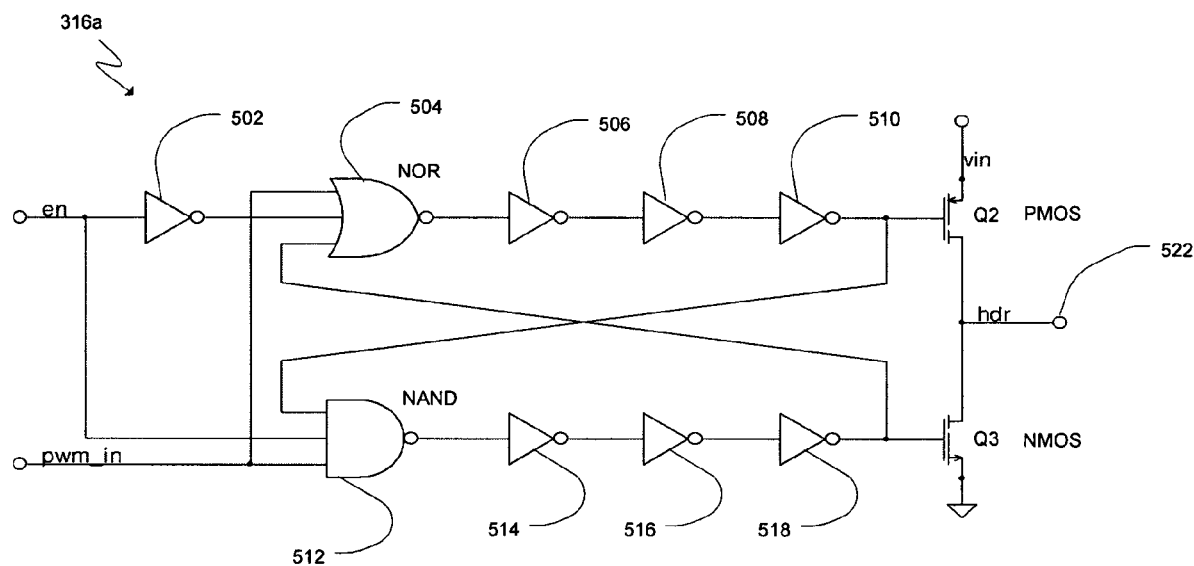
FIG. 5 illustrates a circuit diagram of one embodiment of the driver of the pulse width modulation circuitry of the controller of FIG. 3.

FIG. 5 illustrates an embodiment 316a of the driver 316 of the PWM circuitry 204a of FIG. 3 in more detail. The driver 316a may include a plurality of inverters 502, 506, 508, 510, 514, 516, 518, a NOR gate 504, a NAND gate 512, and transistors Q2 and Q3. Transistor Q2 may be a PMOS transistor and transistor Q3 may be an n-type metal oxide semiconductor field effect transistor (MOSFET) or NMOS.

When the enable signal is a digital zero, the output of inverter 502 may be a digital one. Since one input to the NOR gate 504 is a digital one, the output of the NOR gate 504 may be a digital zero. The output of inverter 506 may therefore be a digital one, of inverter 508 may be a digital zero, and finally of inverter 510 may be a digital one. Since transistor Q2 is a PMOS in this embodiment, transistor Q2 may be OFF in response to the digital one signal from the inverter 510. The output of the NAND gate 512 may be a digital one when the enable signal is a digital zero. The output of the inverter 514 may therefore be a digital zero, of inverter 516 may be a digital one, and finally of inverter 518 may be a digital zero. Since transistor Q3 is an NMOS in this embodiment, transistor Q3 may also be OFF and the driver 316a is effectively disabled when the enable signal is a digital zero. Since the terminal 522 of the driver 316a that provides the hdr control signal is coupled to the PMOS transistor Q2 and the NMOS transistor Q3 that are both OFF, no output signal hdr is provided by the driver 316a when the enable signal is a digital zero. As such, the driver 316a is effectively disabled. In other words, the driver 316a may effectively be in a high impedance state when the enable signal is a digital zero.

When the enable signal is a digital one, the hdr signal may be the inverse of the pwm_in signal as illustrated in FIG. 4. The pwm_in signal may be a digital one or digital zero. When the pwm_in signal is a digital one and the enable signal is a digital one, the output of the NOR gate 504 may be a digital zero. Accordingly, the output of the inverter 506 may therefore be a digital one, of inverter 508 may be a digital zero, and finally of inverter 510 may be a digital one. In response to the digital one from the inverter 510, PMOS transistor Q2 may be OFF. When pwm_in is a digital one and the enable signal is a digital one, the three inputs to the NAND gate 512 may also be a digital one and hence the output of the NAND gate 512 may be a digital zero. This leads to the output of the inverter 518 being a digital one and hence NMOS transistor Q3 may be ON.

When the pwm_in signal is a digital zero and the enable signal is a digital one, the output of the output of the NAND gate 512 may be a digital one and hence the output of the inverter 518 may be a digital zero. In response, the NMOS transistor Q3 may be OFF. The three inputs to the NOR gate 504 may then be a digital zero in this instance. Hence the output of the NOR gate 504 may be a digital one and the output of the inverter 510 may be a digital zero. In response, the PMOS transistor Q2 may be ON. Accordingly, when the enable signal is a digital one, the hdr signal may be the inverse of the pwm_in signal as illustrated in FIG. 4 and when the enable signal is a digital zero the driver may be effectively disabled by turning OFF transistors Q2 and Q3.

Figure 6:
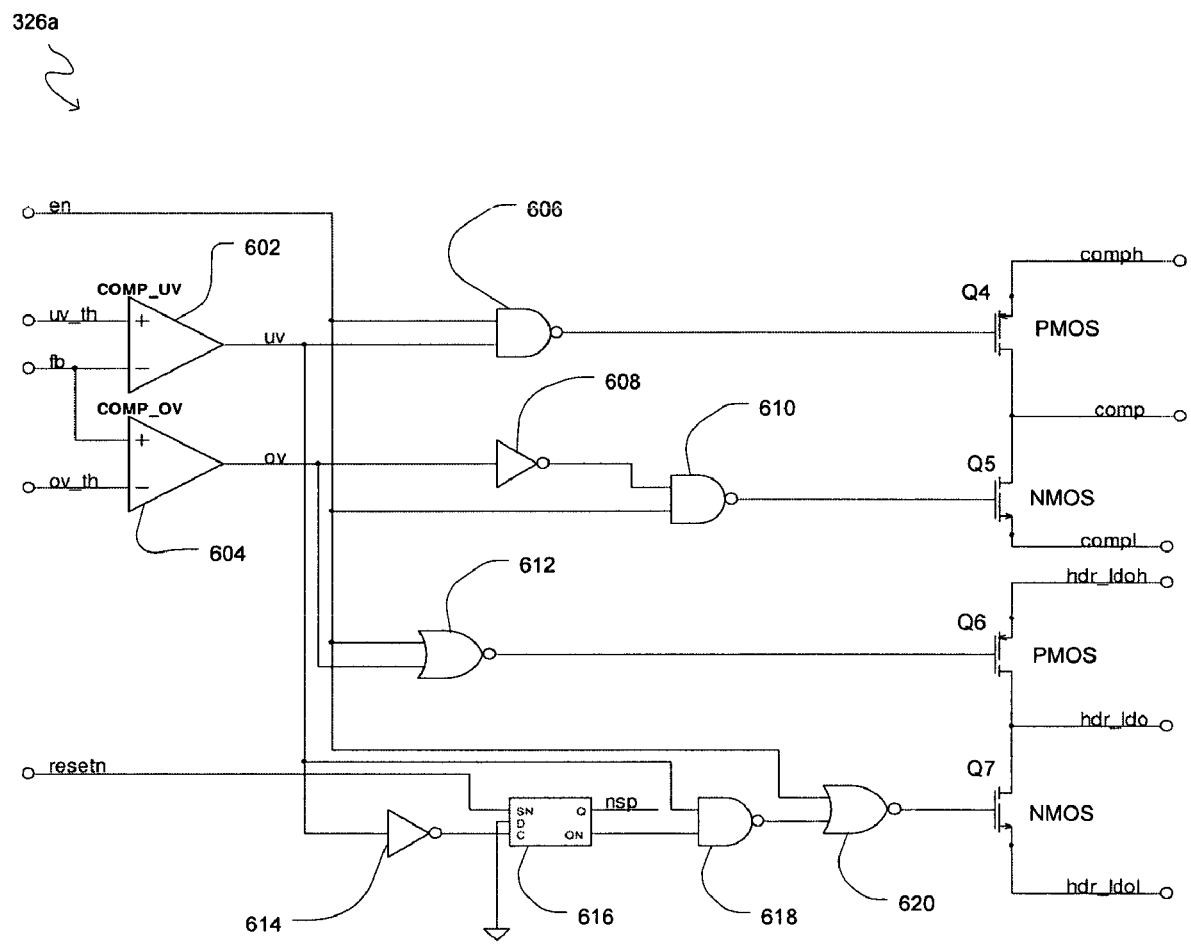
FIG. 6 illustrates a circuit diagram of one embodiment of the over voltage/under voltage protection circuitry of the controller of FIG. 3.

FIG. 6 illustrates an embodiment 326a of the over voltage/under voltage protection circuitry 326 of FIG. 3 in more detail. In general, if no over voltage or under voltage condition is detected, the "comp" and "hdr_ldo" signals of FIG. 3 are not compensated. If an under voltage condition is detected, the comp signal may be pulled up and the hdr_ldo signal may be pulled down to drive up the output voltage Vout. If an over voltage condition is detected, the comp signal may be pulled down and the hdr_ldo signal may be pulled up to drive down the output voltage Vout.

The over voltage/under voltage protection circuit 326a may include two comparators 602, 604. The under voltage comparator 602 may compare the feedback signal (fb) representative of the output voltage with an under voltage threshold level. If the feedback signal is not less than the under voltage threshold level, the comparator 602 may output a digital zero. If the feedback signal is equal to or less than the under voltage threshold level, the comparator 602 may output a digital one. Similarly, the over voltage comparator 604 may compare the feedback signal with an over voltage threshold. If the feedback signal is not greater than the over voltage threshold level, the comparator 604 may output a digital zero. If the feedback signal is greater than or equal to the over voltage threshold level, the over voltage comparator 604 may output a digital one.

In operation, if the enable signal is a digital one indicating use of the PWM circuitry 204a and the feedback voltage level is not less than the under voltage threshold level or greater than the over voltage threshold level, the outputs of comparators 602 and 604 would be a digital zero. Hence, the output of NAND gate 606 would be a digital one. In response, the PMOS transistor Q4 would be OFF. The output of inverter 608 would be a digital one and the output of NAND gate 610 would be a digital zero. In response, the NMOS transistor Q5 would also be OFF. Accordingly, no compensation would be applied to the comp signal in this instance.

Further in operation, if the enable signal is a digital zero indicating use of the LDO circuitry 202a and the feedback voltage level is not less than the under voltage threshold level or greater than the over voltage threshold level, the outputs of comparators 602 and 604 would still be a digital zero. Hence, the inputs to the NOR gate 612 would both be digital zero and its output would be a digital one. In response, the PMOS transistor Q6 would be OFF. The output of NOR gate 620 would be a digital zero. In response, the NMOS transistor Q7 would be OFF. Accordingly, no compensation would be applied to the hdr_ldo signal in this instance.

If the enable signal was a digital one indicating use of the PWM circuitry 204a and the feedback voltage was less than the under voltage threshold, the output of the under voltage comparator 602 would be a digital one. Since both inputs to the NAND gate 606 are a digital one in this instance, its output would be a digital zero. In response, the PMOS transistor Q4 would turn ON and pull up the comp signal to comph. By pulling up the comp signal to comph the duty cycle of the pwm_in signal would be increased to increase the output voltage level and hence the feedback voltage level.

If the enable signal was a digital one indicating use of the PWM circuitry 204a and the feedback voltage was greater than the over voltage threshold, the output of the over voltage comparator 604 would be a digital one. Hence, the output of the inverter 608 would be a digital zero. Given a digital one and digital zero input to NAND gate 610, its output would be a digital one. In response, the NMOS transistor Q5 would turn ON and pull down the comp signal to compl. By pulling down the comp signal to compl the duty cycle of the pwm_in signal would be decreased to decrease the output voltage level and hence the feedback voltage level.

If the enable signal was a digital zero indicating use of the LDO circuitry 202a and the feedback signal was greater than the over voltage threshold, the output of the over voltage comparator 604 would be a digital one. Given a digital zero and digital one input to the NOR gate 612, its output would be a digital zero. In response, the PMOS transistor Q6 would turn ON. This would pull hdr_ldo up to hdr_ldoh which in turn would pull down the output voltage Vout.

If the enable signal was a digital zero indicating use of the LDO circuitry 202a and the feedback signal was less than the under voltage threshold, the output of the under voltage comparator 602 would be a digital one. If both inputs to the NAND gate 618 were a digital one because the output QN of the D flip flop 616 was also a digital one, then the output of NAND gate 618 would be a digital zero. With both inputs to NOR gate 620 being a digital zero, the output of NOR gate 620 would be a digital one. In response, the NMOS transistor Q7 would turn ON. This would pull hdr_ldo down to hdr_ldol which in turn would pull up the output voltage Vout.

The over voltage/under voltage protection circuitry 326a can further be utilized to guarantee a smooth transition as the controller 201 transitions from the switching mode to the linear mode or from the linear mode to the switching mode. Usually during transition between the switching and linear modes, the feedback control loops acts fast enough to maintain the change in output voltage Vout within the under and over voltage thresholds. However, if the transition is accompanied by a large load transient causing the output voltage Vout to increase above the over voltage threshold or below the under voltage threshold, the controller 201 may take advantage of the over voltage/under voltage protection circuitry 326a to force the comp or hdr_ldo signal to certain voltage levels and work in a hysteresis operation mode.

The "hysteresis" concept may also be used to describe operation of a comparator. An ideal comparator may toggle when two inputs to the comparator, e.g., Vinp and Vinm are, equal. To avoid oscillation of the comparator in this instance, a "hysteresis comparator" may be utilized. The output of the hysteresis comparator may be a digital zero when the two inputs to the hysteresis comparator are equal, e.g., when Vinp=Vinm. The output of the hysteresis comparator may be a digital one when Vinp=Vinm+ΔV, where ΔV may be a small portion of Vinm.

There "hysteresis operation mode" of FIG. 6 may be somewhat similar to the operation of the hysteresis comparator. For instance, when the output voltage Vout of the DC to DC converter 104a of FIG. 3 is controlled by the over voltage/under voltage protection circuitry 326a of FIG. 6, Vout may not be equal to an ideal set value. Rather, Vout may have a non-zero peak to peak value ΔV, which may be determined by the threshold levels, uv_th and ov_th according to the equation ΔV=ov_th−uv_th.

Thus, the over voltage/under voltage protection circuitry 326a may be capable of comparing a signal representative of the output voltage of the DC to DC converter to an over voltage threshold level, e.g., by comparator 604 in the embodiment of FIG. 6. The circuitry 326a may also be capable of comparing the signal representative of the output voltage of the DC to DC converter to an under voltage threshold level, e.g., by comparator 602 in the embodiment of FIG. 6. The circuitry 326a may also be capable of driving the output voltage towards a desired output voltage level if the signal representative of the output voltage of the DC to DC converter is greater than the over voltage threshold level. The circuitry 326a may also be capable of driving the output voltage towards the desired output voltage level if the signal representative of said output voltage of the DC to DC converter is less than the under voltage threshold level to thus ensure said output voltage remains in a range defined by a difference between the over voltage threshold level and the under voltage threshold level during a transition between the linear and PWM modes.

The reset signal (resetn) may be input to the D flip-flop 616. The reset signal may be used to avoid false under voltage situations during soft starts when the output voltage starts from about 0 volts and increases to the regulated output voltage. During such soft start condition, the initial low output voltage may otherwise trigger NMOS transistor Q7 to turn ON. The QN output of the D flip-flop may provide a digital zero in response to the reset signal such that the NAND gate 618 output is a digital one and the NOR gate 620 output is a digital zero to keep NMOS transistor Q7 OFF. Thus, the over voltage/under voltage protection circuitry 326a may be capable of identifying a soft start condition when the output voltage starts from about zero volts and increases to a desired or regulated output voltage level. The over voltage/under voltage protection circuitry 326a may also be capable of effectively disabling the comparing operation performed by the comparator 602 to avoid a false under voltage judgment during the soft start condition.

Figure 7:
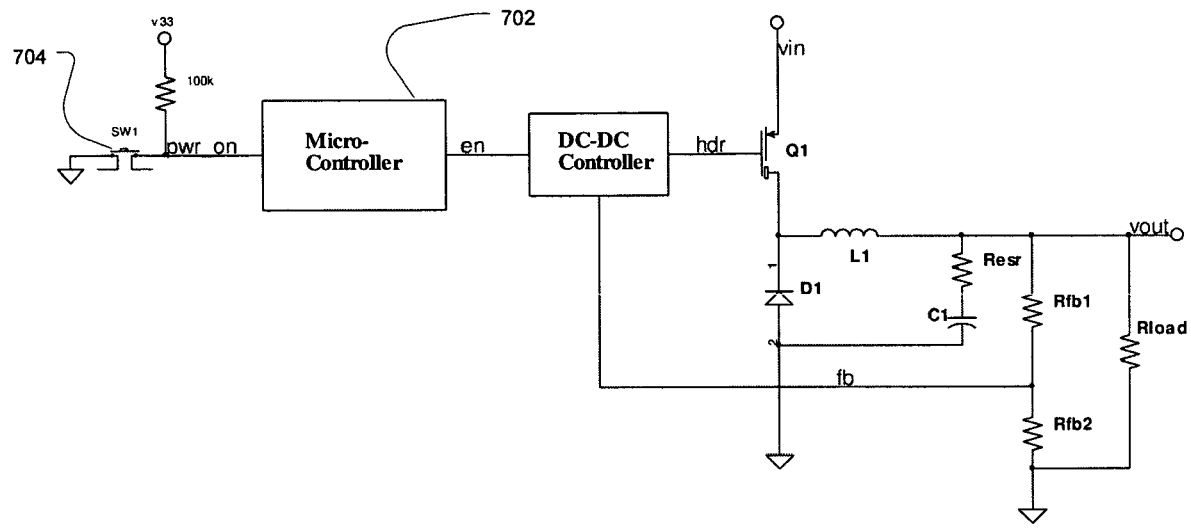
FIG. 7 is a diagram of one embodiment for providing an enable signal to the controller of FIGS. 2 or 3.

The enable signal could be provided from a variety of sources. FIG. 7 illustrates one potential source of the enable signal as a microcontroller 702. The microcontroller 702 may be powered on in portable devices once a user pushes the power on button 704.

Figure 8:
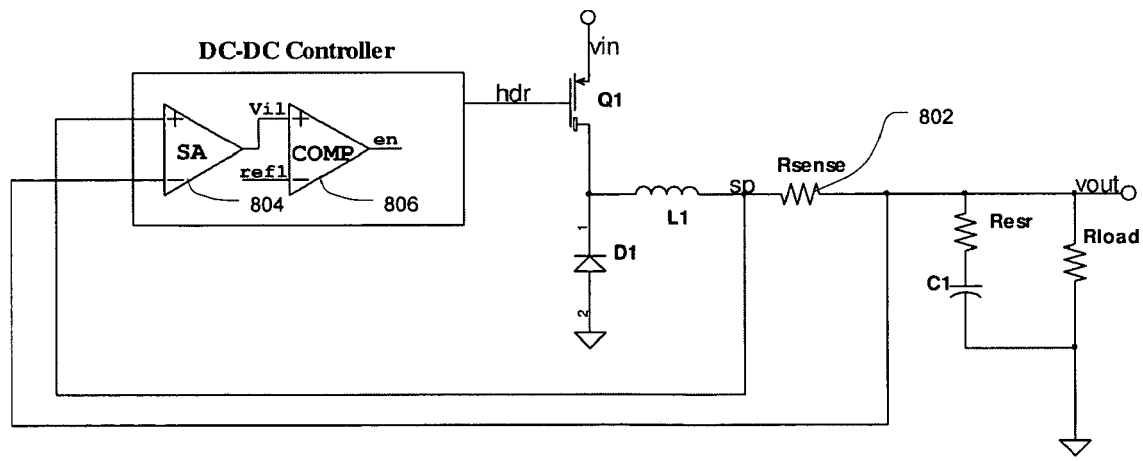
FIG. 8 is a circuit diagram of another embodiment for providing the enable signal to the controller of FIGS. 2 or 3.

FIG. 8 illustrates another embodiment that may provide the enable signal in response to varying load conditions. A sense resistor 802 may be utilized to sense the load current. The voltage drop across the sense resistor 802 may be proportional to the load current. Since the resistive value of the sense resistor 802 may be quite small, a sense amplifier 804 may be utilized to amplify this value to provide a voltage level representative of the load current or Vil. A comparator 806 may then compare the voltage Vil with a reference voltage level ref1 and provide the enable signal in response to the comparison. When the voltage level Vil is greater than the reference voltage level ref1, the comparator 806 may provide an enable signal in a digital one state. When the voltage level Vil is less than the reference voltage level ref1, the comparator 806 may provide an enable signal in a digital zero state. In other words, when the load is a relatively heavy load, the controller may operate PWM circuitry 204a to maintain high efficiency with the heavy load. When the load is a relatively light load, the controller may operate LDO circuitry 202a to produce low noise output.

Figure 9:
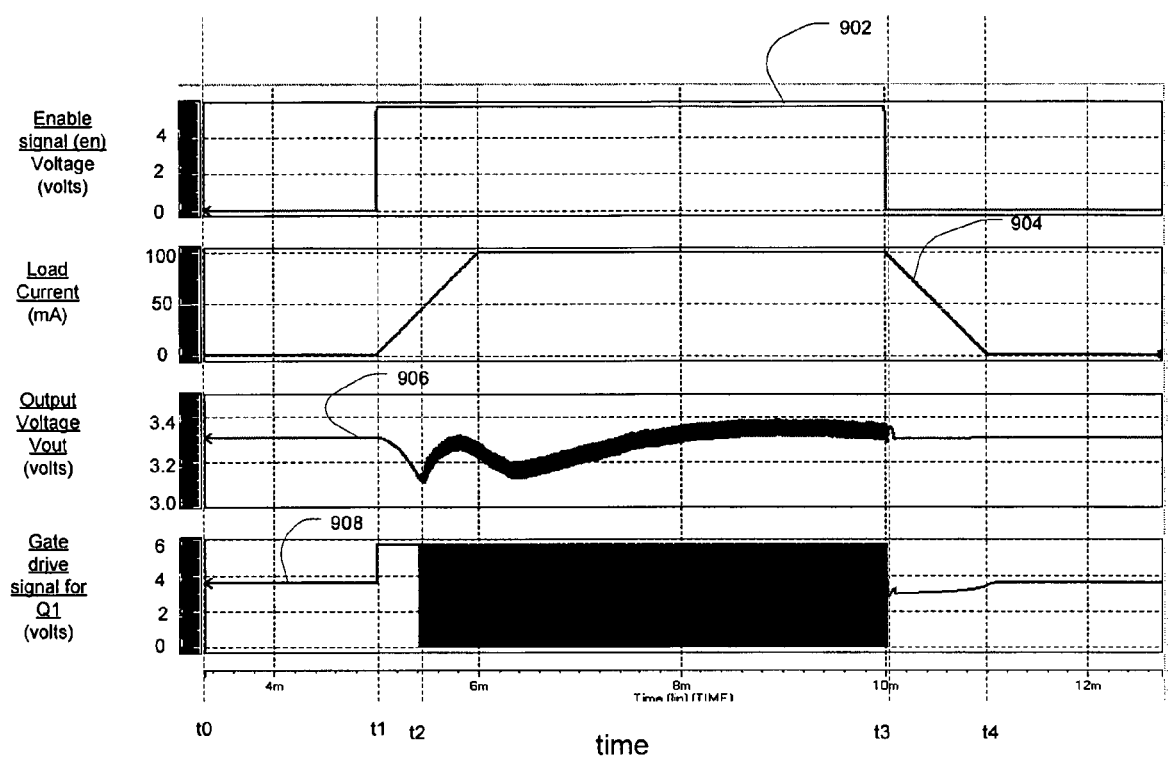
FIG. 9 illustrates plots of simulation results for the DC to DC converter of FIG. 3.

FIG. 9 shows a simulation result of the DC to DC converter 104a of FIG. 3. Plot 902 is a plot of the enable signal (en). Plot 904 is a plot of load current of the DC to DC converter changing from 1 milliamp (mA) to 100 mA. Plot 906 is a plot of the output voltage Vout of the DC to DC converter and plot 908 is a plot of the gate drive signal provided to the control terminal of PMOS transistor Q1. Between times t0 and t1, the plot 902 of the enable signal is a digital zero. Accordingly, the controller 201a is an LDO mode and LDO circuitry 202a provides the gate drive signal to the PMOS transistor Q1. During this time period between times t0 and t1, the load current remained relatively low and constant at 1 mA as indicated by plot 904. The output voltage also remained relatively constant at 3.3 volts as indicated by plot 906. Accordingly, the gate drive signal provided by the LDO circuitry 202a to the PMOS transistor Q1 as indicated by plot 908 also remained relatively constant during this time period.

At time t1, the enable signal changed from a digital zero to a digital one indicating a transition from LDO mode to a PWM mode where the PWM circuitry 204a provides the gate control signal to the PMOS transistor Q1. The comp signal which may represent the voltage level of the compensating capacitor Cc may be less than a level, e.g., 1 volt, such that the resulting duty cycle of the pwm_in signal 342 may be zero. As such, the resulting hdr signal to control the gate of PMOS transistor Q1 may be a digital one as detailed by plot 908 during the time period between times t1 and t2. Also between times t1 and t2, the output voltage may drop (plot 906) as the load current increases (plot 904).

Figure 10:
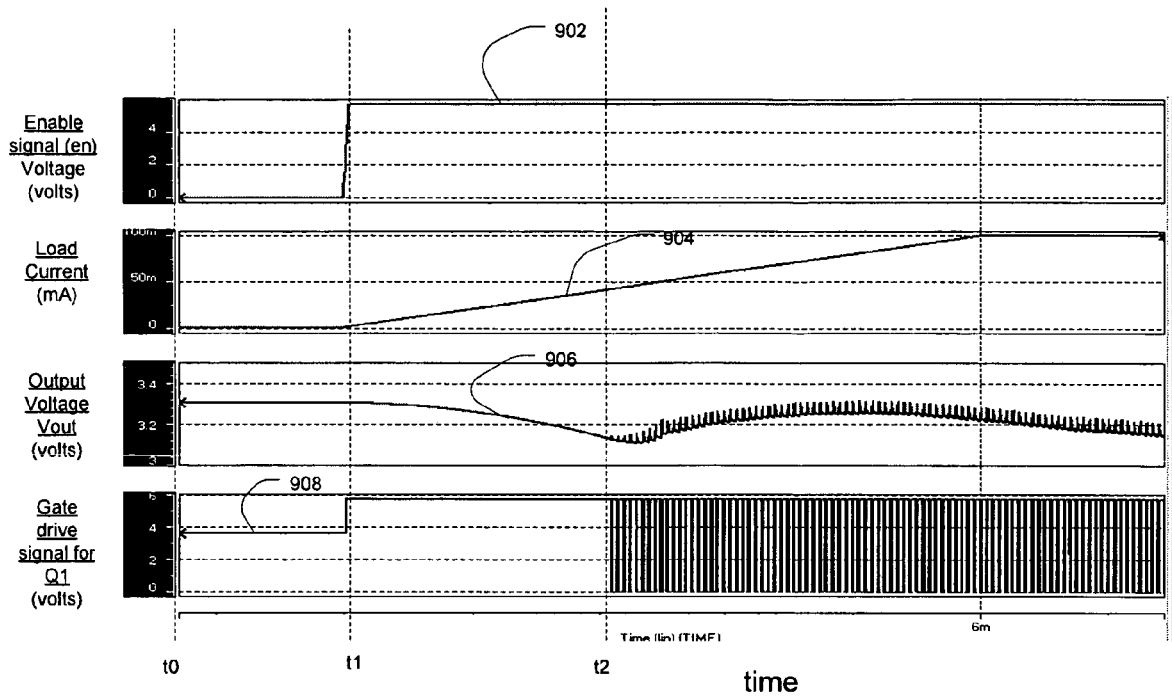
FIG. 10 is a zoomed in version of the plot of FIG. 9 during the transition from LDO mode to PWM mode.

Once the comp signal reaches the threshold level, e.g., 1 volt, at time t2 the duty cycle of the pwm_in signal 342 may increase above zero and the resulting hdr signal from the driver 316 may oscillate as detailed by plot 908 between times t2 and t3 (also seen in FIG. 10). The output voltage may start to increase back to the desired value of 3.3 volts as detailed by plot 906 between times t2 and t3. The output voltage may have a ripple between times t2 and t3 due to the turning ON and OFF of the PMOS transistor Q1.

At time t3, the enable signal may transition from a digital one to a digital zero indicating a transition from PWM mode back to LDO mode where the LDO circuitry 202a provides the gate drive signal (hdr_ldo in this instance) to the PMOS transistor Q1. The gate drive signal may increase between times t3 and t4 (plot 908) as the load current decreases (plot 904) to drive the output voltage (plot 906) to its regulated value of 3.3 volts.

Figure 11:
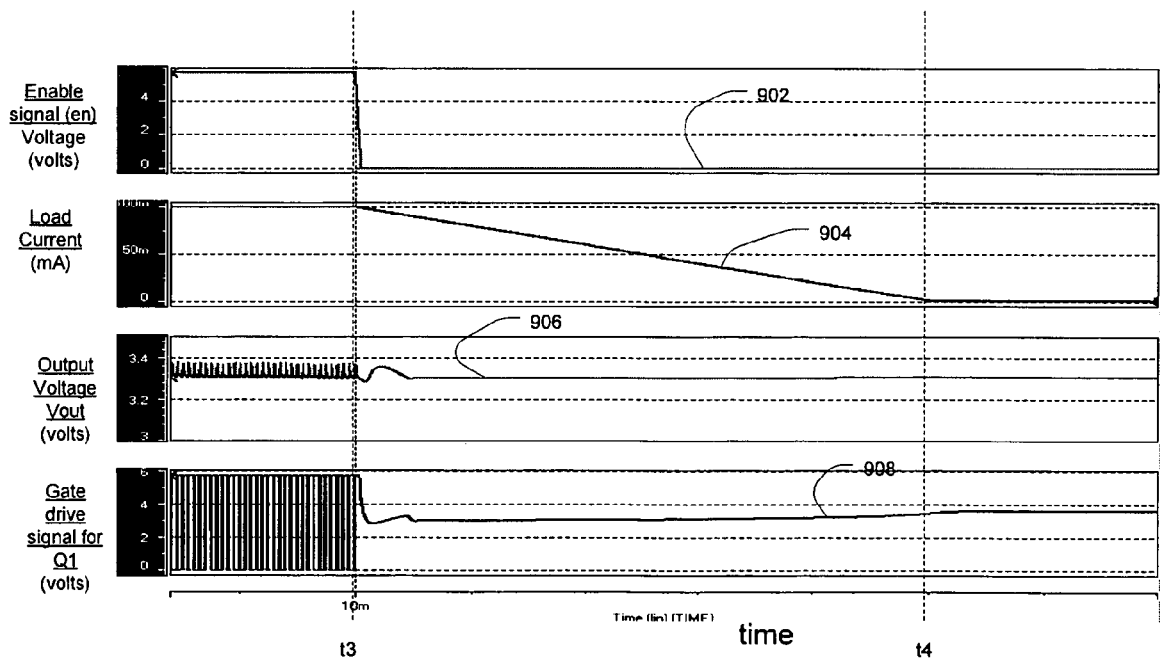
FIG. 11 is a zoomed in version of the plot of FIG. 9 during the transition from PWM mode to LDO mode.

FIG. 10 is zoomed in version of the plots of FIG. 9 during the transition period when the controller 201a changes from LDO mode control to PWM mode control centered about time t2. FIG. 11 is another zoomed in version of the plots of FIG. 9 during the transition period when the controller changes from PWM mode to LDO mode centered about time t3.

It is known that one challenge of LDO design is loop stability over a wide range of loads currents. It may be that the LDO is stable for a light load but unstable for a heavier load. This requires compensation to be performed for the LDO which adds costs and complexity. For instance, the equivalent series resistance (Resr) of the capacitor C1 in FIG. 3 may be utilized for compensation purposes. This would then require a capacitor C1 with a well defined equivalent series resistance and would degrade the transient performance of the output voltage Vout. Other compensation solutions may also be designed which add complexity and cost to the LDO.

Table 1 indicates an example of an AC analysis of an LDO under light load (1 mA in this embodiment) and heavy load (100 mA in this embodiment) conditions. As illustrated, the phase margin of 78.5882 degrees is adequate for the light load condition but is negative for the heavy load condition. This LDO would need some compensation for the heavy load conditions for stability.

TABLE 1

| Index | iload | gain(db) | unitfreq | phasemargin | temper | alter# |
|---|---|---|---|---|---|---|
| 1 | 1 mA | 72.1337 | 1.673e+03 | 78.5882 | 60.0000 | 1.0000 |
| 2 | 100 mA | 80.7657 | 5.640e+04 | −0.9238 | 60.0000 | 1.0000 |

Advantageously, the controller 201a of FIG. 3 may operate the LDO circuitry 202a only in light load conditions and switch to PWM circuitry 204a in heavy load conditions. Therefore, the LDO circuitry 202a remains stable with little cost and complexity needed for additional compensation methods to assure stability at heavier loads and the controller 201a remains stable over a wide range of load currents.

Figure 12:
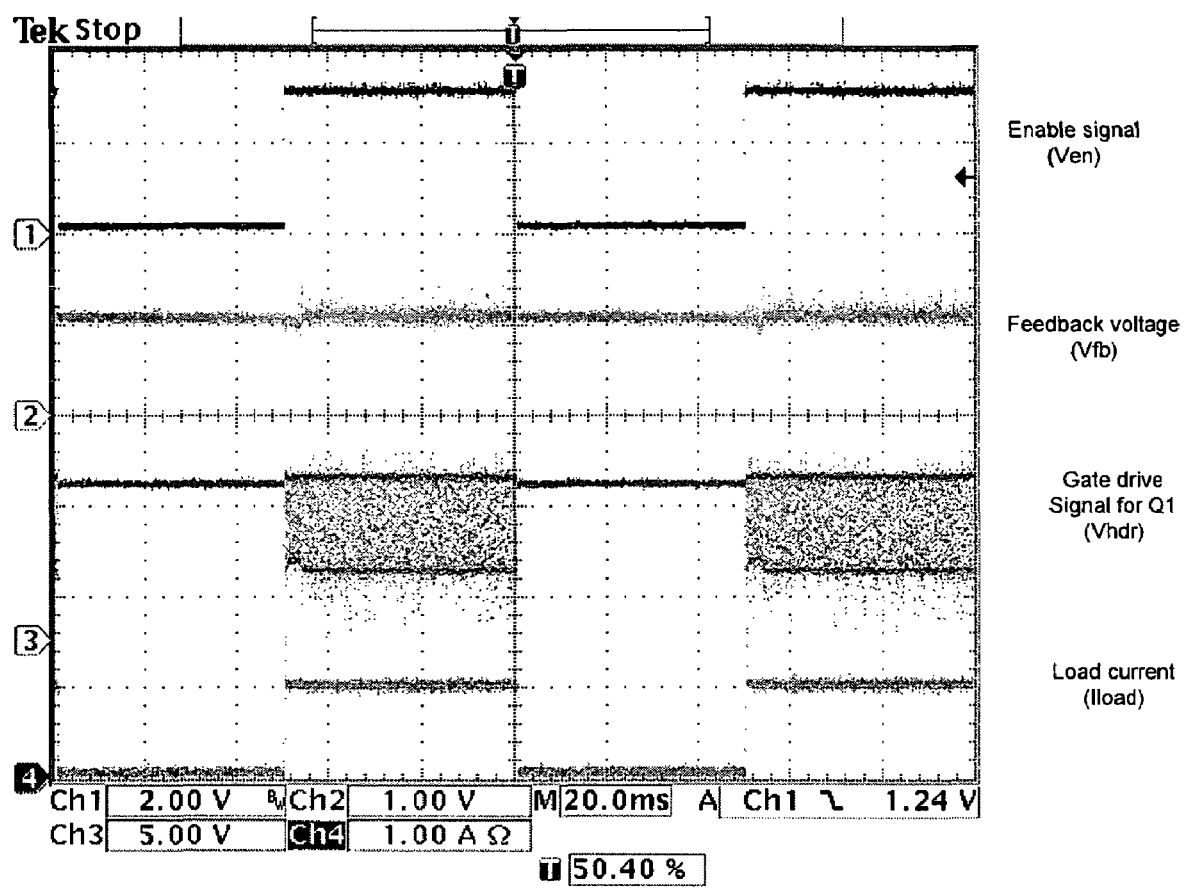
FIG. 12 illustrates plots of test results for the DC to DC converter of FIG. 3.
Figure 13:
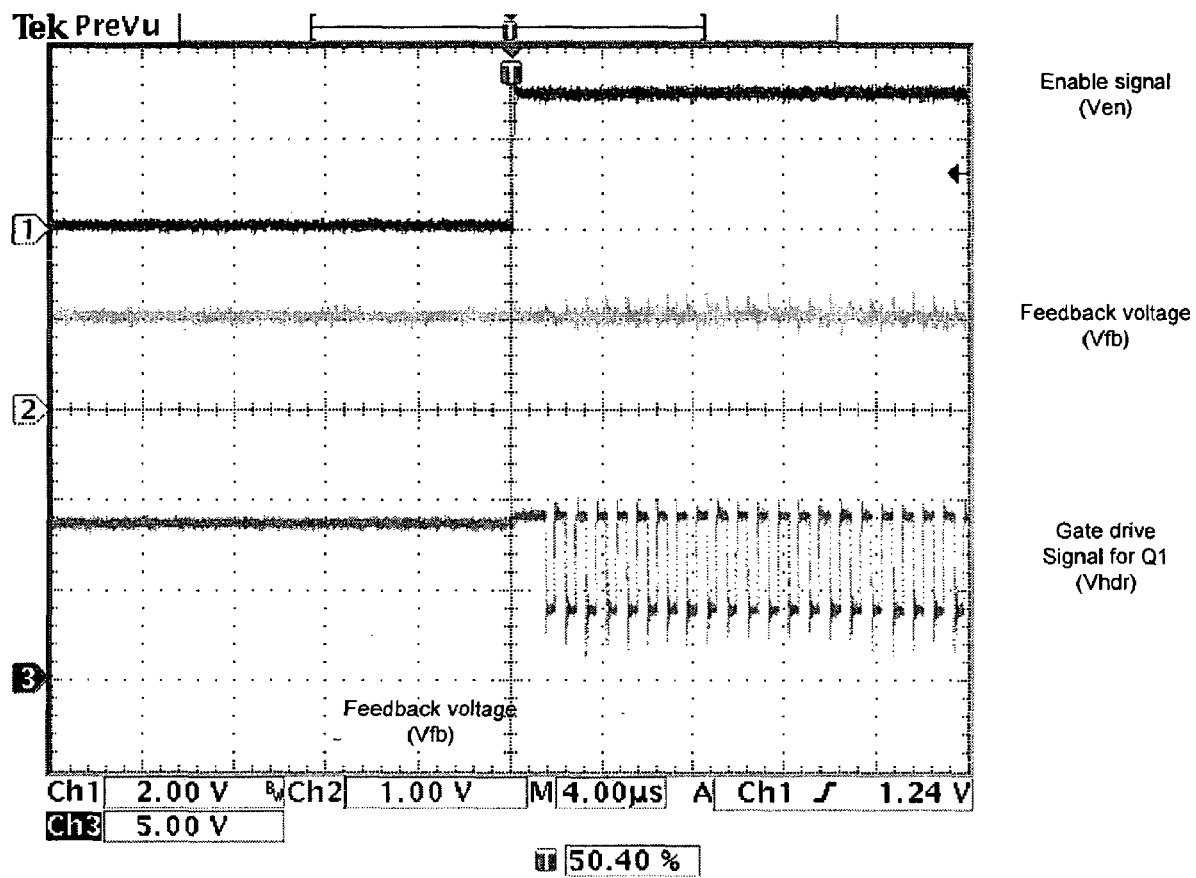
FIG. 13 is a zoomed in version of some of the plots of FIG. 12 during the transition from LDO mode to PWM mode.
Figure 14:
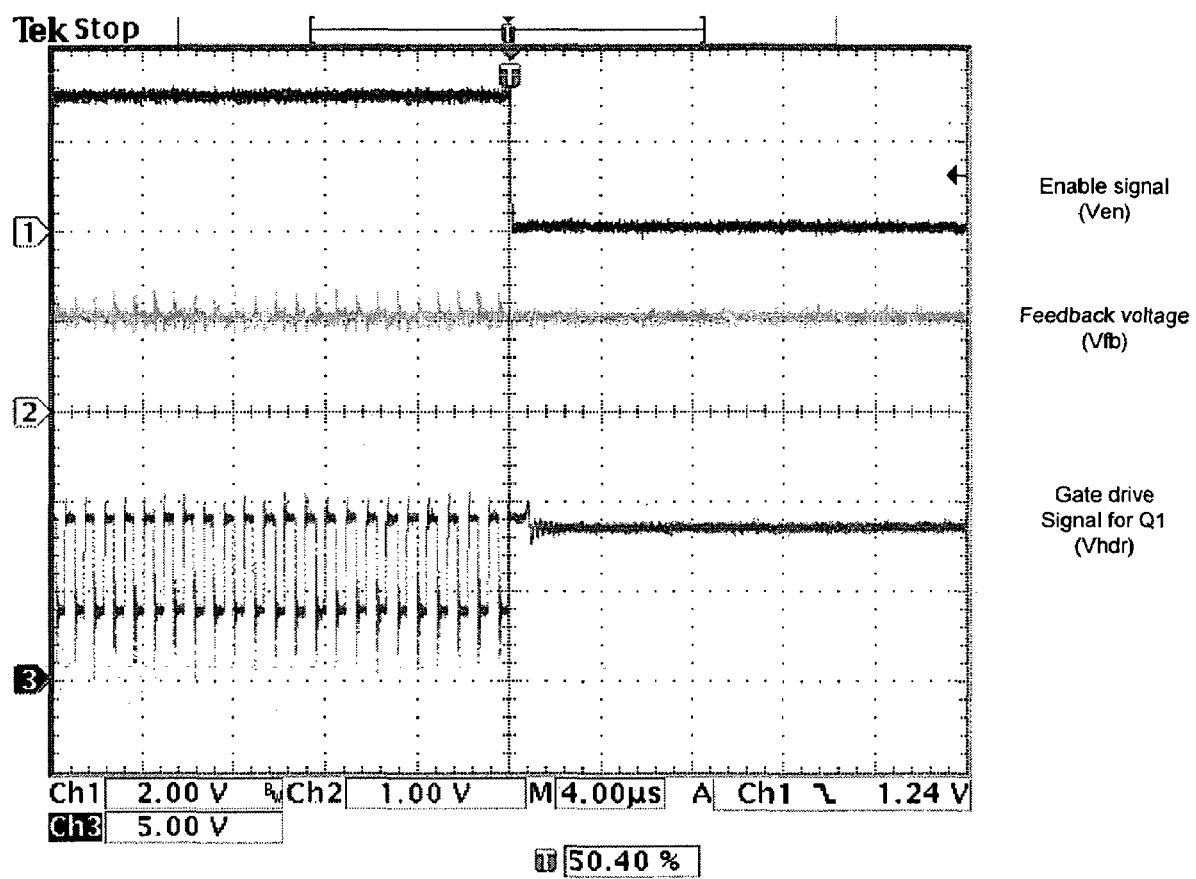
FIG. 14 is a zoomed in version of some of the plots of FIG. 12 during the transition from PWM mode to LDO mode.

FIG. 12 illustrates plots of test results for the DC to DC converter of FIG. 3. Channel 1 illustrates the voltage of the enable signal (Ven), while Channel 2 represents a feedback voltage (Vfb) representative of the output voltage of the DC to DC converter. Channel 3 represents the gate drive signal to the transistor Q1 (Vhdr), while Channel 4 represents the load current (Iload) of the DC to DC converter. FIG. 13 is a zoomed in version of the Ven, Vfb, and Vhdr plots of FIG. 12 during the transition from LDO mode to PWM mode when the enable signal changes from a digital zero to a digital one. FIG. 14 is a zoomed in version of the Ven, Vfb, and Vhdr plots of FIG. 12 during the transition from PWM mode to LDO mode when the enable signal changes from a digital one to a digital zero. As illustrated, the test results of FIGS. 12-14 support the simulation results of FIGS. 9-11.

Figure 15:
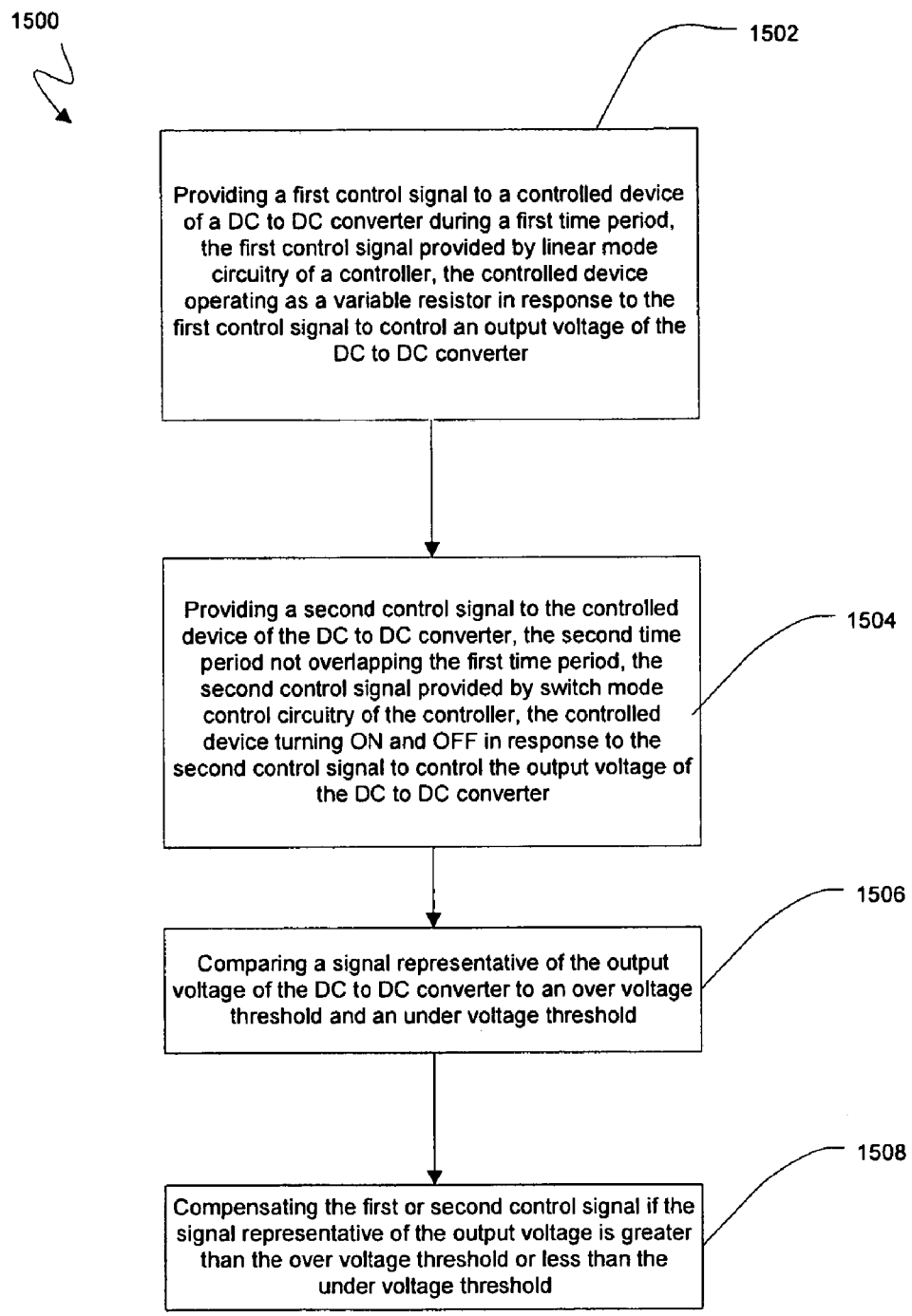
FIG. 15 is a flow chart of operations consistent with an embodiment.

FIG. 15 illustrates operations 1500 according to one embodiment. Operation 1502 may include providing a first control signal to a controlled device of a DC to DC converter during a first time period, the first control signal provided by linear mode control circuitry of a controller, the controlled device operating as a variable resistor in response to the first control signal to control an output voltage of the DC to DC converter. Operation 1504 may include providing a second control signal to the controlled device of the DC to DC converter during a second time period, the second time period not overlapping the first time period, the second control signal provided by switch mode control circuitry of the controller, the controlled device turning ON and OFF in response to the second control signal to control the output voltage of the DC to DC converter. Operation 1506 may include comparing a signal representative of said output voltage of said DC to DC converter to an over voltage threshold level and an under voltage threshold level, and operation 1508 may include compensating the first or second control signal if the signal representative of the output voltage is greater than the over voltage threshold level or less than the under voltage threshold level.

Figure 16:
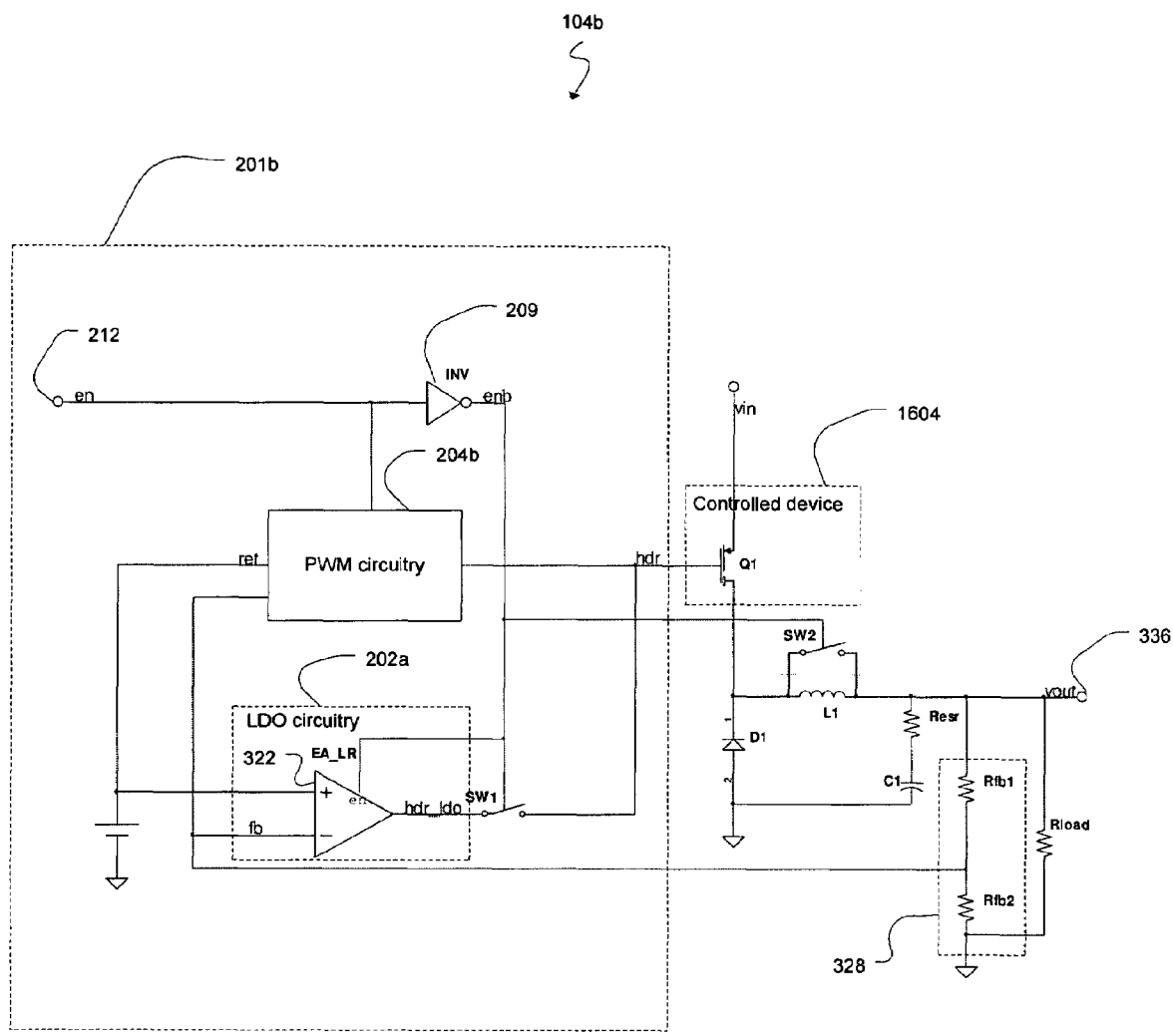
FIG. 16 is a diagram of another embodiment of the DC to DC converter of FIG. 3.

FIG. 16 is a diagram of another embodiment 104b of the DC to DC converter 104a of FIG. 3. Similar components of FIG. 16 are labeled similarly to those components of FIG. 3 and hence any repetitive description of such components is omitted herein for clarity. The DC to DC converter 104b may include switch SW2 coupled in parallel with inductor L1. When the enable signal is a digital zero, both switches SW1 and SW2 may close in response to the digital one signal output from the inverter 209. Switch SW2 may enable better transient performance when the LDO circuitry 202a provides an analog control signal to the controlled device 1604.

The controlled device 1604 may include a variety of devices that can act as a variable resistor when receiving the analog control signal from the LDO circuitry 202a and can act as a switch to switch ON and OFF when receiving the PWM control signal from the PWM circuitry 204b. In one embodiment, the controlled device may be a transistor. The transistor may be a variety of types of transistors such as a bipolar junction transistor (BJT), an isolated gate bipolar transistor (IGBT), or a field effect transistor (FET) such as a MOSFET including the PMOS transistor Q1.

Figure 17:
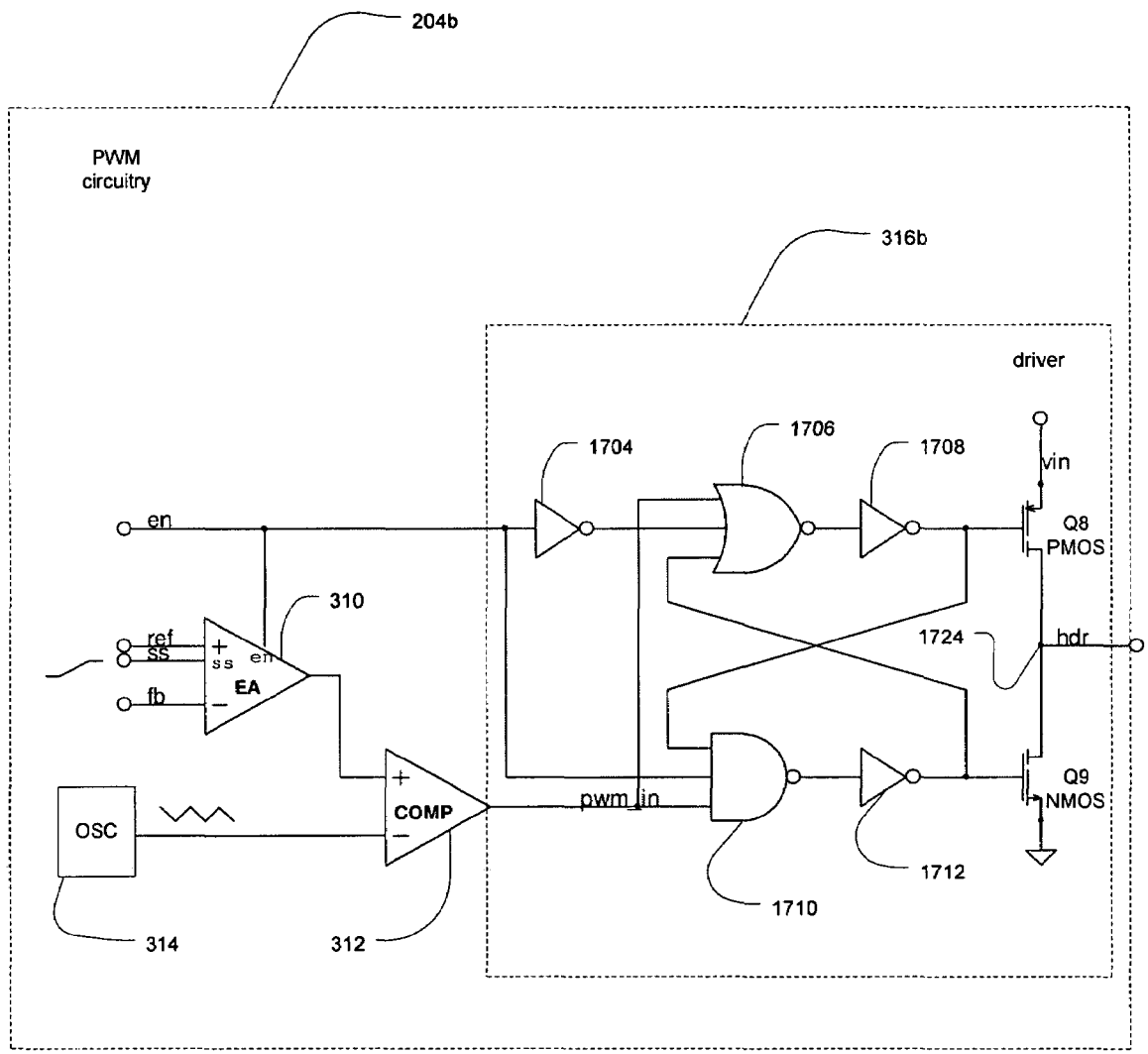
FIG. 17 is a circuit diagram of the pulse width modulation circuitry of FIG. 16.

FIG. 17 is a circuit diagram of the PWM circuitry 204b of FIG. 16. The PWM circuitry may include the oscillator 314, error amplifier 310, comparator 312, and another embodiment of a driver 316b consistent with the driver 316 of FIG. 3. Similar components of FIG. 17 are labeled similarly to those components of FIG. 3 and hence any repetitive description of such components is omitted herein for clarity. The driver 316b may include a first inverter 1704, a NOR gate 1706, a second inverter 1708, a NAND gate 1710, a third inverter 1712, and transistors Q8 and Q9 at an output stage of the driver 316b. Transistor Q8 may be a PMOS transistor and transistor Q9 may be an NMOS transistor. The hdr output control signal from the driver 316b may be output from a node 1724 coupled between the drain terminals of PMOS transistor Q8 and NMOS transistor Q9.

When the enable signal is a digital zero, the output of the first inverter 1704 may be a digital one. Since one input to the NOR gate 1706 is a digital one, the output of the NOR gate 1706 may be a digital zero. The output of second inverter 1708 may therefore be a digital one. Since transistor Q8 is a PMOS transistor in this embodiment, transistor Q8 may be OFF in response to a digital one signal from second inverter 1708. The output of the NAND gate 1710 may be a digital one when the enable signal is a digital zero and the output of the second inverter 1708 provided to the NAND gate 1710 is a digital one. The output of the third inverter 1712 may therefore be a digital zero and, in response NMOS transistor Q9 may also be OFF. Therefore, both transistors Q8 and Q9 may be OFF in response to the enable signal being a digital zero and the driver 316b may therefore be effectively disabled in this instance. In other words, the driver 316b may effectively be in a high impedance state when the enable signal is a digital zero.

When the enable signal is a digital one, the hdr signal may be the inverse of the pwm_in signal as illustrated in FIG. 4. The pwm_in signal may be a digital zero or digital one. When the pwm_in signal is a digital zero and the enable signal is a digital one, the output of the output of the NAND gate 1710 may be a digital one and hence the output of the third inverter 1712 may be a digital zero. In response, the NMOS transistor Q9 may be OFF. The three inputs to the NOR gate 1706 may then be a digital zero in this instance. Hence the output of the NOR gate 1706 may be a digital one and the output of the second inverter 1708 may be a digital zero. In response, the PMOS transistor Q8 may be ON.

When the pwm_in signal is a digital one and the enable signal is a digital one, the output of the NOR gate 1706 may be a digital zero. Accordingly, the output of the second inverter 1708 may therefore be a digital one. In response to the digital one from the second inverter 1708, PMOS transistor Q8 may be OFF. When pwm_in is a digital one and the enable signal is a digital one, the three inputs to the NAND gate 1710 may also be a digital one and hence the output of the NAND gate 1710 may be a digital zero. This leads to the output of the third inverter 1712 being a digital one and hence NMOS transistor Q9 may be ON. Accordingly, when the enable signal is a digital one, the hdr signal may be the inverse of the pwm_in signal as illustrated in FIG. 4 and when the enable signal is a digital zero the driver 316b may be effectively disabled by turning OFF transistors Q8 and Q9.

Advantageously, one controller may be capable of operating linear mode circuitry and switch mode circuitry. Therefore, only one controller and one DC to DC converter is necessary to perform operations that conventionally required two DC to DC converters and two controllers. Hence, costs are reduced. The controller can switch between linear mode and switch mode operation in order to take advantage of the benefits of each. For instance, if the linear mode circuitry comprises LDO circuitry, the controller can operate in LDO mode during light load conditions. Hence, noise is reduced. The switch mode circuitry may comprise PWM circuitry and the controller can operate in a PWM mode to provide a PWM signal to a controlled device of the DC to DC converter during heavier load conditions. Accordingly, high efficiency may be achieved when serving heavier loads. Furthermore, if the LDO circuitry serves only light loads, expensive and complex compensation schemes for the LDO circuitry may be avoided. Such expensive and complex compensation schemes may be necessary if the LDO circuitry serves heavier loads.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A controller for a DC to DC converter capable of switching between a linear mode and a switch mode, comprising:
   linear mode control circuitry capable of providing a first control signal to a controlled device of said DC to DC converter, said controlled device operating as a variable resistor in response to said first control signal to control an output voltage of said DC to DC converter;
   switch mode control circuitry capable of providing a second control signal to said controlled device of said DC to DC converter, said controlled device operating as a switch to turn ON and OFF in response to said second control signal to control said output voltage of said DC to DC converter, one of said linear mode control circuitry and said switch mode control circuitry being enabled to control said controlled device in response to a state of an enable signal; and
   protection circuitry, responsive to said enable signal, and configured to accept a signal representative of said output voltage of said DC to DC converter and compare said signal to an under voltage threshold using an undervoltage hysteresis comparator, said protection circuitry further configured to compensate said first or second control signal provided to said controlled device if said signal representative of said output voltage is less than said under voltage threshold, said protection circuitry further configured to compare said signal representative of said output voltage to an over voltage threshold using an overvoltage hysteresis comparator and to compensate said first or second control signal provided to said controlled device if said signal representative of said output voltage is greater than said over voltage threshold, said undervoltage hysteresis comparator and said overvoltage hysteresis comparator being configured to force said first control signal to a desired voltage level;
   wherein said switch mode control circuitry comprises pulse width modulation (PWM) circuitry and said second control signal comprises a PWM output signal, wherein said controlled device switches ON and OFF in response to a duty cycle of said PWM output signal if said PWM circuitry is enabled to control said controlled device, and wherein said protection circuitry compensates said PWM output signal by increasing said duty cycle if said signal representative of said output voltage is less than said under voltage threshold, and by decreasing said duty cycle if said signal representative of said output voltage is greater than said over voltage threshold;
   wherein said PWM circuitry comprises an error amplifier and a driver to provide said PWM output signal, each of said error amplifier and said driver individually responsive to said enable signal to provide said PWM output signal when said enable signal is in a first state and to not provide said second control signal when said enable signal is in a second state.

2. The controller of claim 1, wherein said driver comprises:
   a first inverter to accept said enable signal and provide an output signal;
   a NOR gate to accept said output signal from said first inverter and to accept a PWM input signal from a comparator of said PWM circuitry;
   a second inverter to accept an output signal from said NOR gate and to provide a first control signal;
   a first transistor to accept said first control signal;
   a NAND gate to accept said first control signal from said second inverter, and to accept said enable signal, and to accept said PWM input signal;
   a third inverter to accept an output signal from said NAND gate and to provide a second control signal; and
   a second transistor to accept said second control signal, said second control signal output a terminal of said driver coupled to said first and second transistor.

3. The controller of claim 2, wherein one of said first and second transistor is ON in response to a value of said input PWM signal so that said PWM output signal provided by said driver is an inverse of said PWM input signal.

4. The controller of claim 1, wherein said linear mode control circuitry comprises a linear mode error amplifier that is individually responsive to said enable signal.

5. The controller of claim 4, wherein said linear mode error amplifier has a switch operatively coupled to its output, and said switch is individually responsive to said enable signal.

6. A DC to DC convener comprising:
   a controlled device; and
   a controller to control said controlled device, said controller comprising:
   linear mode control circuitry capable of providing a first control signal to said controlled device of said DC to DC converter, said controlled device operating as a variable resistor in response to said first control signal to control an output voltage of said DC to DC converter;
   switch mode control circuitry capable of providing a second control signal to said controlled device of said DC to DC converter, said controlled device operating as a switch to turn ON and OFF in response to said second control signal to control said output voltage of said DC to DC converter, one of said linear mode control circuitry and said switch mode control circuitry being enabled to control said controlled device in response to a state of an enable signal; and protection circuitry, responsive to said enable signal, and configured to accept a signal representative of said output voltage of said DC to DC converter and compare said signal to an under voltage threshold using an undervoltage hysteresis comparator, said protection circuitry further configured to compensate said first or second control signal provided to said controlled device if said signal representative of said output voltage is less than said under voltage threshold, said protection circuitry further configured to compare said signal to an over voltage threshold using an overvoltage hysteresis comparator and to compensate said first or second control signal provided to said controlled device if said signal representative of said output voltage is greater than said over voltage threshold, said undervoltage hysteresis comparator and said overvoltage hysteresis comparator being configured to force said first control signal to a desired voltage level;

wherein said switch mode control circuitry comprises pulse width modulation (PWM) circuitry and said second control signal comprises a PWM output signal, wherein said controlled device switches ON and OFF in response to a duty cycle of said PWM output signal if said PWM circuitry is enabled to control said controlled device, and wherein said protection circuitry compensates said PWM output signal by increasing said duty cycle if said signal representative of said output voltage is less than said under voltage threshold, and by decreasing said duty cycle if said signal representative of said output voltage is greater than said over voltage threshold;

wherein said PWM circuitry comprises an error amplifier and a driver to provide said PWM output signal, each of said error amplifier and said driver individually responsive to said enable signal to provide said PWM output signal when said enable signal is in a first state and to not provide said second control signal when said enable signal is in a second state.

7. The DC to DC convener of claim 6, wherein said controlled device comprises a transistor operating in a linear region in response to said first control signal and operating as switch in response to said second control signal.

8. The DC to DC converter of claim 7, wherein an inductor is coupled to a terminal of said transistor, and wherein a switch is coupled in parallel with said inductor, said switch configured to close in response to said enable signal when said linear mode control circuitry provides said first control signal to said transistor.

9. The DC to DC convener of claim 6, wherein said driver comprises:
 a first inverter to accept said enable signal and provide an output signal;
 a NOR gate to accept said output signal from said first inverter and to accept a PWM input signal from a comparator of said PWM circuitry;
 a second inverter to accept an output signal from said NOR gate and to provide a first control signal;
 a first transistor to accept said first control signal;
 a NAND gate to accept said first control signal from said second inverter, and to accept said enable signal, and to accept said PWM input signal;
 a third inverter to accept an output signal from said NAND gate and to provide a second control signal; and
 a second transistor to accept said second control signal, said second control signal output a terminal of said driver coupled to said first and second transistor.

10. The DC to DC converter of claim 9, wherein one of said first and second transistor is ON in response to a value of said input PWM signal so that said PWM output signal provided by said driver is an inverse of said PWM input signal.

11. The DC to DC converter of claim 6, wherein said linear mode control circuitry comprises a linear mode error amplifier that is individually responsive to said enable signal.

12. The DC to DC converter of claim 11, wherein said linear mode error amplifier has a switch operatively coupled to its output, and said switch is individually responsive to said enable signal.

13. A method comprising:
 providing an enable signal;
 providing a first control signal to a controlled device of a DC to DC converter during a first time period and in response to said enable signal being in a first state, said first control signal provided by linear mode control circuitry of a controller, said controlled device operating as a variable resistor in response to said first control signal to control an output voltage of said DC to DC converter;
 providing a second control signal to said controlled device of said DC to DC converter during a second time period and in response to said enable signal being in a second state, said second time period not overlapping said first time period, said second control signal provided by switch mode control circuitry of said controller, said controlled device turning ON and OFF in response to said second control signal to control said output voltage of said DC to DC converter;
 comparing, with protection circuitry responsive to said enable signal, a signal representative of said output voltage of said DC to DC converter to an over voltage threshold level and an under voltage threshold; and
 compensating, with said protection circuitry, an enabled one of said first or second control signal if said signal representative of said output voltage is greater than said over voltage threshold level or less than said under voltage threshold level;
 wherein said switch mode control circuitry comprises pulse width modulation (PWM) circuitry and said second control signal comprises a PWM output signal, wherein said controlled device switches ON and OFF in response to a duty cycle of said PWM output signal if said PWM circuitry is enabled to control said controlled device, and said PWM circuitry comprises an error amplifier and a driver to provide said PWM output signal, each of said error amplifier and said driver individually responsive to said enable signal to provide said PWM output signal when said enable signal is in a first state and to not provide said second control signal when said enable signal is in a second state.

14. The method of claim 13, wherein said compensating operation comprising driving said output voltage of said DC to DC converter to a desired output voltage level to maintain said output voltage in a range defined by a difference between said over voltage threshold level and said under voltage threshold level during a transition between said first time period and said second time period.

15. The method of claim 13, wherein said compensating operation of said method comprises:
increasing a duty cycle of said PWM output signal if said signal representative of said output voltage is less than said under voltage threshold; and
decreasing said duty cycle of said PWM output signal if said signal representative of said output voltage is greater than said over voltage threshold.

16. The method of claim 13, further comprising: comparing a feedback signal representative of an output current level of said DC to DC converter with a threshold level, and selecting said linear mode control circuitry to provide said first control signal to said controlled device if said feedback signal is less than said threshold level and selecting said switch mode circuitry to provide said second control signal to said controlled device if said feedback signal is greater than or equal to said threshold level.

17. The method of claim 13, wherein said linear mode control circuitry comprises a linear mode error amplifier that is individually responsive to said enable signal.

18. The method of claim 17, wherein said linear mode error amplifier has a switch operatively coupled to its output, and said switch is individually responsive to said enable signal.

* * * * *